Patented Oct. 22, 1946

2,409,712

UNITED STATES PATENT OFFICE 2,409,712

CHEMICAL PROCESS AND PRODUCTS

Carl E. Schweitzer, Newport, Del., assignor to E. I. du Pont de Nemours & Company, Wilmington, Del., a corporation of Delaware No Drawing. Application February 3, 1944, Serial No. 520,932

12 Claims. (Cl. 260—453)

This invention relates to isocyanic esters, and particularly to a process for preparing isocyanic esters from readily available starting materials.

Hitherto, aliphatic esters of isocyanic acid were prepared by reaction between aliphatic sulfates and potassium cyanate. The aryl isocyanates were generally prepared by other processes, such as by the reaction of phosgene with aromatic amines, or the reaction of aryl urethanes with phosphorus pentoxide (Sidgewick's Organic Chemistry of Nitrogen, by Taylor and Baker, Clarendon Press, 1937, pages 331–332).

An object of the present invention is to provide an improved process for preparing isocyanates. A more particular object is to provide a process for preparing isocyanic esters from N-substituted carbamic esters. Another object is to prepare aliphatic and aromatic esters of isocyanic acid from N-substituted carbamic esters without the use of $P_2O_5$ or other such reagents.

These and other objects are accomplished in accordance with this invention by pyrolysis of the N-substituted carbamic ester, followed by separation of the isocyanic ester from the pyrolysis products. This separation, according to this invention, is effected before the pyrolysis products have had time to reunite to reform the N-substituted carbamic esters. When the pyrolysis is carefully controlled, as hereinafter described, the following reactions occur (R is an aryl, alkyl, alkoxyalkyl, or alkoxyalkoxyalkyl group; R' is an alkyl, alkoxyalkyl, or alkoxyalkoxyalkyl group):

(1)   RNHCOOR' → RNCO + R'OH (2)   RNCO + R'OH → RNHCOOR'

Since Reaction 1 takes place at elevated temperatures and Reaction 2 takes place at ordinary temperature, the pyrolysis products formed by Reaction 1 must be separated before the products are consumed by Reaction 2.

The N-substituted carbamic esters which may be pyrolyzed in accordance with this invention include the N-alkyl, N-alkoxyalkyl, N-alkoxyalkoxyalkyl and N-aryl carbamic esters of the aliphatic alcohols. The esters of N-alkyl carbamic acids, in which the N-alkyl group contains from 1 to 12 carbon atoms, may be used very effectively. For best results, the ester group in such carbamates should correspond to an alcohol which preferably is sufficiently high boiling to be separated readily from the alkyl isocyanate produced by the pyrolysis. When the alcohol has a boiling point which is higher than the boiling point of the isocyanate, with which it is associated, the separation may be effected by distillation of the pyrolyzate. When the separation is rapid, i. e. if the boiling points of the isocyanate and alcohol differ widely, reaction between the isocyanate and alcohol is avoided, or appreciably limited. Even when the boiling points of isocyanate and alcohols are close together, at least a part of the isocyanate present in the pyrolyzate can generally be separated before recombination to form the carbamic ester can occur.

Suitable carbamic esters which yield separable pyrolysis products according to this invention include beta-methoxyethyl N-methyl carbamate, isopropyl N-methyl carbamate, beta-ethoxyethyl N-methyl carbamate, butyl N-methyl carbamate, beta-methoxyethyl N-ethyl carbamate, beta-ethoxy, -beta-ethoxyethyl N-ethyl carbamate, isobutyl N-beta-methoxyethyl carbamate, beta-methoxyethyl N-phenyl carbamate, ethoxy-ethoxyethyl N-isobutyl carbamate, and the like. Esters of N-phenyl carbamic acids, such as methyl N-phenyl carbamate and ethyl N-phenyl carbamate may be pyrolyzed to give phenyl isocyanates, which can be separated from the pyrolyzate. In the latter instances the isocyanate boils at a considerably higher temperature than the alcohol produced by pyrolysis, hence is readily separable therefrom by quick distillation. Also, it is possible in accordance with this invention to prepare phenyl isocyanate by pyrolysis of an N-phenyl carbamic ester of an alcohol which has a boiling point higher than the normal boiling point of phenyl isocyanate (B. P. 166° C.). This permits distillation of the phenyl isocyanate from the pyrolysis product as a first fraction, which is an advantage since rapid removal of the isocyanate is desirable.

Certain of the carbamic esters which are used in the practice of this invention may be prepared by reaction between amines, urea and alcohols, as follows:

In the above equation R is an aryl, alkyl, alkoxyalkyl, or alkoxyalkoxyalkyl group, and R' represents alkyl, alkoxyalkyl or an alkoxyalkoxyalkyl group. The reaction as written takes place when the reagents are heated to a temperature in the range 150° C. to 350° C., preferably under superatmospheric pressure. The N-alkyl and N-aryl carbamates may also be prepared by reaction between an N,N'-dialkyl or N,N'-diaryl urea and an alcohol, as follows:

In this equation R is an aryl or alkyl group and

R' is an alkyl, alkoxyalkyl or alkoxyalkoxyalkyl group. The reaction as written takes place when the reactants are heated at about 150° C. or higher. If the alcohol has a boiling point above 150° C. the reaction proceeds satisfactorily at atmospheric pressure, but if the alcohol has a lower boiling point than 150° C., it is preferable to employ superatmospheric pressure. Generally the N-alkyl or N-aryl carbamic ester can be distilled from the reaction product without difficulty.

The pyrolysis of the N-substituted carbamic esters may be conducted either in the liquid or the vapor phase. The pyrolysis temperature should be in the range of 135° to 500° C. Preferably the pyrolysis pressure should be about atmospheric or less. It is convenient to pyrolyze the high boiling N-substituted carbamate in the liquid phase at temperatures above about 250° C., at subatmospheric pressures. Undesirable side reactions, such as trimerization of the isocyanate, are avoided or appreciably suppressed by operating at diminished pressure, or in the presence of a carrier gas.

The rapid separation of the isocyanate from the other pyrolysis products is generally accomplished by quick distillation, or by selective condensation, either at atmospheric or subatmospheric pressure. Various means may be used, according to this invention, to facilitate the separation so as to avoid recombination of the isocyanate and alcohol. For example, a third component may be employed as a diluent during distillation. Such third component may form an azeotrope with either the alcohol or the isocyanate, thereby facilitating the removal of the said alcohol or isocyanate from the pyrolyzate. Alternatively, the pyrolyzate may be collected in a solvent which dissolves either the alcohol or the isocyanate selectively, and the phase containing the isocyanate may be withdrawn and distilled. In certain instances the alcohols produced by the pyrolysis are azeotropic with the isocyanates which are simultaneously produced. When this occurs, it is desirable to distill the azeotrope, and thereafter to allow the alcohol and isocyanate contained therein to recombine, prior to redistilling the excess isocyanate.

The pyrolysis of the N-substituted carbamic esters may be conducted in any suitable apparatus such as a tubular converter made of quartz, glass, inert metal, or the like. No specific catalyst is required, but it is helpful to have the converter packed with a material which serves to promote an even distribution of heat. Such packing materials are silver, copper, broken glass, silica, porcelain and the like.

This invention is further illustrated by the following examples.

*Example 1.*—A mixture containing 2.5 moles of ethoxyethoxyethanol

and 1 mole of N,N'-diisobutyl urea was heated for 2 hours at 200° C. The resulting product contained 0.75 mole of ethoxyethoxyethyl N-isobutyl carbamate. This carbamate was pyrolyzed in the liquid phase at 200° C. under 20 mm. pressure, and the pyrolyzate was conducted directly to a stripper column in which the isocyanate was separated from the ethoxyethoxyethanol by distillation. Pure isobutyl cyanate (B. P. 106° C.) was obtained in 60.5% yield.

*Example 2.*—Methyl N-methyl carbamate was passed at the rate of one mole per hour through a Pyrex tube containing 100 cc. of quartz packing, 8 to 14 mesh, at 430° C. to 440° C. The throughput rate in this experiment was limited by the rate of heat input, rather than the rate of reaction. A very slow stream of nitrogen was passed through the tube during the pyrolysis to maintain a positive flow. The pyrolyzate was quickly distilled, giving a methanol-methyl isocyanate azeotrope which boiled at 36.4°. After all the methanol in the azeotrope had been allowed to recombine, pure methyl isocyanate, B. P. 38.9° C., was recovered by distillation.

*Example 3.*—Urea (0.5 mole) laurylamine (0.15 mole) and ethoxyethoxyethanol (1.0 mole) was heated for 3 hours at 200° C. Conversion to ethoxyethoxyethyl N-lauryl carbamate was 57%. The resulting mixture was pyrolyzed in the liquid phase at a pressure of about 2 mm. and a temperature of 210° to 230° C. Lauryl isocyanate was separated from ethoxyethoxyethanol in the pyrolyzate by distributing these two pyrolysis products between cyclohexane and water. Distillation of the cyclohexane layer gave lauryl isocyanate (B. P. 106 to 110° at 1 to 2 mm.) in 75% yield.

*Example 4.*—Beta-isobutoxymethoxy)ethylamine (0.5 mole), urea (0.5 mole) and ethoxyethoxyethanol (1.5 moles) were heated for 3 hours at 160° to 240° C.; 95% of the theoretical amount of ammonia was evolved. Excess ethoxyethoxyethanol was removed by distillation, and the carbamate (ethoxyethoxyethyl N-beta (isobutoxymethoxy) ethyl carbamate) was pyrolyzed in the liquid phase at a temperature within the range 200° to 250° C. under subatmospheric pressure (20 mm.). The isocyanate (beta-(isobutoxymethoxy)ethyl isocyanate, B. P. 80 to 82° at 7 mm.) was separated from the ethoxyethoxyethanol by introducing the pyrolyzate into cyclohexane-water mixture, and distilling the cyclohexane layer. The overall conversion of isobutoxymethoxyethylamine to beta-(isobutoxymethoxy)ethyl isocyanate was 55%.

*Example 5, sym.*—Diphenyl urea (0.5 mole) was processed in boiling ethoxyethanol (1.5 moles) for several hours to yield ethoxyethoxyethyl N-phenyl carbamate, aniline being removed by distillation. The carbamate was pyrolyzed at a temperature of about 200° C. and a pressure of 2 to 5 mm., yielding phenyl isocyanate and ethoxyethoxyethanol. These products were distributed between water-cyclohexane mixture, and the cyclohexane layer was distilled. A 37% conversion to phenyl isocyanate, based on the amount of sym-diphenyl urea initially used, was obtained.

The present invention, while illustrated by the foregoing examples, is not limited thereto, but has general application in the preparation of isocyanic esters by pyrolysis of carbamates of the formula, RNHCOOR', wherein R is a member of the class consisting of aryl, alkyl, alkoxyalkyl, alkoxyalkoxyalkyl groups and R' is a member of the class of alkyl, alkoxyalkyl and alkoxyalkoxyalkyl groups. The separation of the isocyanic ester from the resulting pyrolyzate may be effected in any convenient manner, and the invention is not restricted to separation methods herein used as illustrations. It is to be understood that various modifications may be practiced without departing from the spirit and scope of this invention as defined in the appended claims.

I claim:

1. In a process for preparing alkyl isocyanates the steps which comprise heating an N-alkyl carbamic alkyl ester to a pyrolysis temperature of about 135° to 500° C. and immediately separating the resulting alkyl isocyanate from the pyrolysis products before the said products have had time to reunite to form the N-alkyl carbamic alkyl ester.

2. In a process for preparing isocyanic esters the steps which comprise heating to a pyrolysis temperature of about 135° to 500° C. a carbamate of the formula RNHCOOR', wherein R is a member of the class of aryl, alkyl, and alkoxyalkoxyalkyl groups, and R' is a member of the class of alkyl, alkoxyalkyl, and alkoxyalkoxyalkyl, and immediately separating an isocyanic ester from the resultant pyrolyzate before the pyrolysis products have had time to reunite to form the said carbamate.

3. In a process for preparing isocyanic esters the steps which comprise subjecting to pyrolysis at a temperature in the range of 150° C. to 350° C. a carbamate of the formula RHNCOOR', wherein R is a member of the class of aryl, alkyl, and alkoxyalkoxyalkyl groups, and R' is a member of the class of alkyl, and alkoxyalkoxyalkyl, and immediately separating an isocyanic ester from the resultant pyrolyzate before the pyrolysis products have had time to reunite to form the said carbamate.

4. The process set forth in claim 3, in which the said carbamate contains an N-alkyl group having from 1 to 12 carbon atoms.

5. In a process for preparing isocyanic esters the steps which comprise heating in the vapor phase at a temperature in the range of 135° C. to 500° C. a carbamate of the formula RNHCOOR', wherein R is a member of the class of aryl, alkyl and alkoxyalkoxyalkyl groups, and R' is a member of the class of alkyl, and alkoxyalkoxyalkyl groups, whereby a pyrolyzate containing an alcohol of the formula R'OH and an isocyanate of the formula RNCO is obtained, and immediately separating the said alcohol from the said isocyanate by rapid distillation before the said alcohol and the said isocyanate have had time to reunite to form the said carbamate.

6. A process for preparing alkyl isocyanates which comprises heating an N-alkyl carbamic ester of an aliphatic alcohol at a temperature in the range of 135° to 500° C., thereby producing a pyrolyzate containing alkyl isocyanate and aliphatic alcohol, and separating rapidly at least part of the said alkyl isocyanate and aliphatic alcohol before recombination thereof to form N-alkyl carbamic ester can occur.

7. A process for preparing isobutoxymethoxyethyl isocyanate which comprises heating beta-(isobutyoxymethoxy) ethylamine, urea, and ethoxyethanol at a temperature in the range 160° to 204° C., whereby ethoxyethoxyethyl beta-N-(isobutoxymethoxy) ethyl carbamate is produced, pyrolyzing the said ethoxyethoxyethyl, beta-(N-isobutoxymethoxy) ethyl carbamate at a temperature in the range 200° to 250° C. under subatmospheric pressure, thus producing ethoxyethoxyethanol and beta-(isobutoxymethoxy) ethyl isocyanate, and immediately separating the said beta-(isobutoxymethoxy) ethyl isocyanate from the ethoxyethoxyethanol so produced before the beta-(isobutoxymethoxy) ethyl isocyanate and the ethoxyethoxyethanol have had time to reunite to form the said ethoxyethoxyethyl beta-(N-isobutoxymethoxy) ethyl carbamate.

8. Beta-(isobutoxymethoxy) ethyl isocyanate.

9. In a process for preparing lauryl isocyanate the steps which comprise heating ethyoxyethoxyethyl N-lauryl carbamate at a temperature in the range 210° to 230° C. in the liquid phase at diminished pressure, and immediately separating lauryl isocyanate from the resultant pyrolysis product sufficiently rapidly so that there is not sufficient time for the said laurl isocyanate to be reconverted to ethoxyethoxyethyl N-lauryl carbamate.

10. In a process for preparing phenyl isocyanate the step which comprises heating at a temperature in the range 135° to 500° C. an N-phenyl carbamic ester of an aliphatic alcohol having a normal boiling point higher than 166° C., and immediately separating phenyl isocyanate from the pyrolysis product sufficiently rapidly so that the said phenyl isocyanate does not have time to reunite with said aliphatic alcohol produced by the pyrolysis to form the said N-phenyl carbamic ester.

11. The process set forth in claim 10, wherein the said pyrolysis is carried out at a pressure of 2 to 5 millimeters.

12. In a process for preparing isocyanic esters the steps which comprise heating in the vapor phase at a temperature in the range of 135° C. to 500° C. a carbamate of the formula RNHCOOR', wherein R is a member of the class of aryl, alkyl and alkoxyalkoxyalkyl groups, and R' is a member of the class of alkyl, and alkoxyalkoxyalkyl groups, whereby a pyrolyzate containing an aliphatic alcohol of the formula R'OH and an isocyanate of the formula RNCO is obtained, extracting the isocyanate from the said pyrolyzate by means of an alcohol-immiscible solvent, and recovering the isocyanate from the resultant extract by distillation, said extracting of the isocyanate being performed sufficiently rapidly so that the isocyanate does not have time to reunite with the said aliphatic alcohol produced by the pyrolysis to form the said carbamate of the formula RNHCOOR'.

CARL E. SCHWEITZER.